United States Patent [19]

Ishikawa et al.

[11] 4,392,166
[45] Jul. 5, 1983

[54] MAGNETORESISTANCE EFFECT TYPE HEAD

[75] Inventors: Shinzaburo Ishikawa, Hirakata; Kenji Kanai, Neyagawa; Nobuyuki Kaminaka, Moriguchi; Tetuo Adachi, Osaka, all of Japan

[73] Assignee: Matsushita Electric Industrial Co., Ltd., Kadoma, Japan

[21] Appl. No.: 237,408

[22] Filed: Feb. 23, 1981

[30] Foreign Application Priority Data

Feb. 25, 1980 [JP] Japan .............................. 55-23442[U]

[51] Int. Cl.³ .......................... G11B 5/30; G11B 5/12; G11B 5/38; G11B 5/20
[52] U.S. Cl. .................................... 360/113; 360/112; 360/123
[58] Field of Search ............... 360/112, 113, 110, 123, 360/109

[56] References Cited

U.S. PATENT DOCUMENTS 3,987,485 10/1976 Sugaya ............................... 360/112
4,025,927 5/1977 Nelson ............................... 360/123
4,155,106 5/1979 Muraoka ............................ 360/112

Primary Examiner—Robert M. Kilgore
Attorney, Agent, or Firm—Wenderoth, Lind & Ponack

[57] ABSTRACT

A magnetoresistance effect type head or an MR head which includes a main portion further having a casing with a recess at its one surface, for providing a bonding surface in the casing so as to be generally U-shape in its cross section, and a magnetoresistance effect type head chip, a support member for a magnetic tape sliding surface and a terminal member for external connection which are all collectively bonded to the bonding surface, and a cover plate further bonded onto the main portion.

5 Claims, 7 Drawing Figures

MAGNETORESISTANCE EFFECT TYPE HEAD

BACKGROUND OF THE INVENTION

The present invention generally relates to a magnetic head for use in magnetic recording and reproduction systems and the like, and more particularly, to a magnetoresistance effect type head (referred to as an MR head hereinbelow) in which an essential portion thereof having a magnetoresistance effect element is made smaller in size than a head main body, while major parts constituting the magnetic head are collectively bonded together in a plane for facilitation of connections at lead portions in the later assembly processes, finishing of a magnetic tape engaging portion, and installation of biasing impressing means, etc.

Conventionally, in a thin film magnetic head, in the case where a base plate or substrate on which an essential element is formed is to contact a recording medium such as a magnetic tape, at least the length of the contact portion of the substrate with respect to the recording medium has been made larger than the width of the recording medium. Accordingly, the number of magnetic head chips which can be obtained from a substrate block during manufacture is small, and thus, the yield thereof per one process specific to the thin film process, tends to be undesirably lowered.

Since the magnetoresistance effect type head or MR head is a thin film head made by the thin film process, it is extremely advantageous in the production to reduce the area per head on the substrate. However, if the head is smaller in size than the tape contact surface, it has been difficult to obtain a favorable contact with the recording medium.

Furthermore, in the case where each thin film magnetic head chip is small in size, there have been various difficulties in making the required magnetic heads with rspect to electrical wiring, mechanical assembly, and also processings of the magnetic heads.

Additionally, the magnetoresistance effect element, the electrical resistance of which varies non-linearly with respect to the external magnetic field, requires a biasing magnetic field for effecting linear functions or functions similar thereto according to the end uses, and setting to the optimum values therefor has been one problem to be solved with respect to the MR heads.

SUMMARY OF THE INVENTION

Accordingly, an essential object of the present invention is to provide an improved magnetoresistance effect head or MR head which is so constructed that an essential portion thereof having a magnetoresistance effect element is made smaller in size than the main body of the head, while the major parts which constitute the magnetic head are collectively bonded together in a plane so as to facilitate lead connections during subsequent assembly processes, finishing of the magnetic tape contacting portion, and installation of bias impressing means, etc., and also to reduce the width of the head itself.

Another important object of the present invention is to provide an improved MR head as described above which has a simple construction and functions accurately, and can readily be manufactured on a large scale at low cost.

In accomplishing these and other objects, according to one preferred embodiment of the present invention, there is provided a magnetoresistance effect type head or MR head which comprises a main portion further including a casing having a recess in one surface for providing a bonding surface in the casing which has a generally U-shape cross section, and a magnetoresistance effect type head chip, a support member having a magnetic tape contact surface and a terminal member for external connection to lead wires, which parts are all collectively bonded to the bonding surface, and a cover plate member further bonded onto the main portion.

By the arrangement according to the present invention as described above, an improved MR head which functions stably and is highly reliable has been advantageously provided and which can be made by simple manufacturing processes, and which substantially eliminates the disadvantages inherent in the conventional magnetic heads of this kind.

BRIEF DESCRIPTION OF THE DRAWINGS

These and other objects and features of the present invention will become apparent from the following description of a preferred embodiment thereof taken with reference to the accompanying drawings, in which.

Before the description of the present invention proceeds, it is to be noted that like parts are designated by like reference numerals throughout the several views of the accompanying drawings.

DETAILED DESCRIPTION OF THE INVENTION

Figure 1:
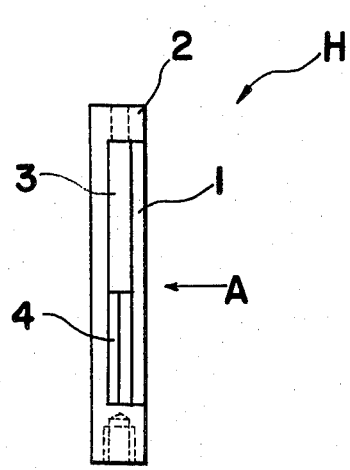
FIG. 1 is a schematic front elevational view of a magnetoresistance effect head or MR head according to one preferred embodiment of the present invention as viewed from a tape contact surface thereof.
Figure 2:
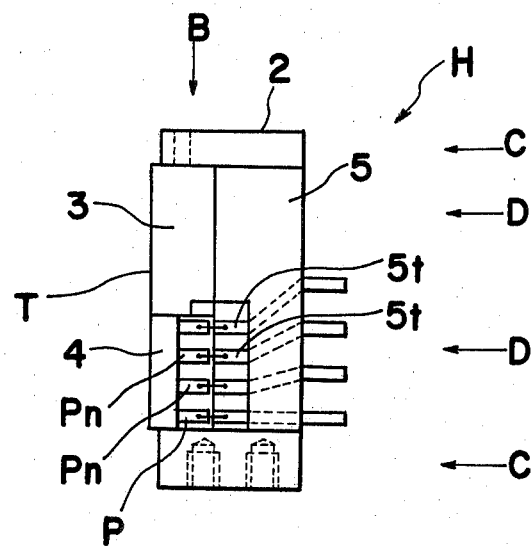
FIG. 2 is a side elevational view of the MR head of FIG. 1, with a cover plate thereof removed for clarity.

Referring now to the drawings, there is shown, in FIGS. 1 and 2, a magnetoresistance effect type head or MR head H according to one preferred embodiment of the present invention.

The MR head H generally includes a casing 2 having an approximately U-shaped cross section, a tape contact surface member in the form of a dummy glass piece 3 providing a side edge Tb of a tape supporting surface T and a magnetoresistance effect type head chip or MR head chip 4 having a side edge Ta of the tape supporting surface T which are provided side by side so as to be flush with each other on one side of a bonding surface 2p (FIG. 3) formed in a recess 2a of the casing 2 so that the side edges Tb and Ta (FIGS. 4 and 5) of the dummy glass piece 3 and MR head chip 4 together from the tape supporting surface T, a terminal plate 5 also provided on the other side of the bonding surface 2p adjacent to said dummy glass piece 3 and MR head chip 4 and electrically connected with the MR head chip 4, and a cover plate 1 having magnet members m1 and m2 (FIG. 7) constituting bias impressing means bonded to one surface thereof and coupled to said MR head chip 4 and terminal plate 5.

Figure 3:
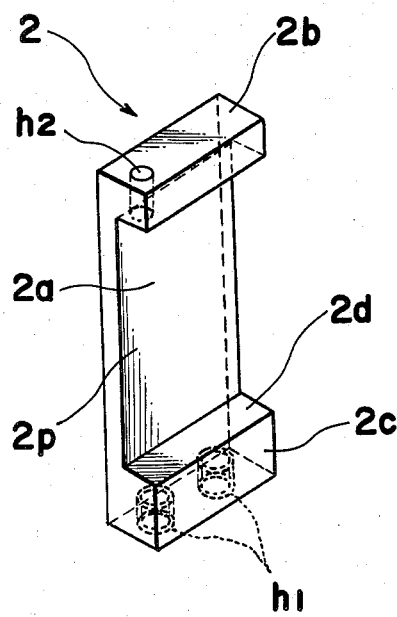
FIG. 3 is a perspective view showing, on an enlarged scale, the structure of a casing employed in the MR head of FIG. 1.

More specifically, as shown in FIG. 3, the casing 2 having the recess 2a for the bonding surface 2p has a lower side wall 2c in which holes h1 for set screws are formed and which has a datum surface 2d at its one side face adjacent to the bonding surface 2p, and an upper wall 2b in which a relief hole or bore h2 is formed for passing a pressing pin (not shown) or the like therethrough for pressing the MR head chip 4 and the dummy glass piece 3 directly onto said datum surface 2d under pressure during bonding, with the bonding surface 2p serving as a plane on which the MR head chip 4, dummy glass piece 3 and terminal plate 5 are bonded as described earlier.

Figure 4:
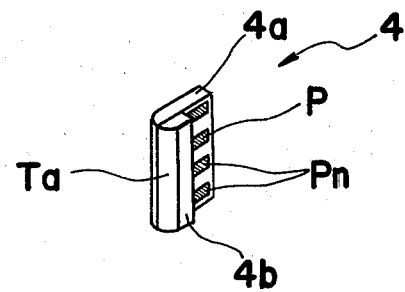
FIG. 4 is a perspective view of a magnetoresistance effect type head chip or MR head chip employed in the MR head of FIG. 1.

Referring to FIG. 4, the MR head chip 4 includes a base plate or substrate 4a, a thin film pattern P of predetermined configuration formed on the substrate 4a, for example, by deposition, and a cover glass plate 4b bonded onto the area of the substrate 4a other than that occupied by terminal lead-out portions Pn of the thin film pattern P so as to protect the deposited thin film pattern. The magnetic tape supporting surface part Ta of the MR head chip 4 is finished into a predetermined shape for smooth contact with the magnetic tape (not shown).

Figure 5:
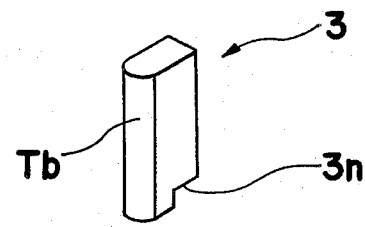
FIG. 5 is a perspective view of a dummy glass member functioning as a tape contact surface support member, and employed in the MR head of FIG. 1.

In FIG. 5, there is shown the dummy glass piece 3 which provides part of the magnetic tape contact surface as described earlier. The reason for employing the dummy glass piece 3 is as follows. Since MR head chips are initially formed in a group, for example, on a glass substrate block (not shown) through deposition or the like of thin film patterns and the block is then sliced, cut etc. into individual MR head chips, the size of a single MR head chip 4 is limited to a minimum, in order to obtain as many MR head chips as possible from one glass substrate block, and thus, the total width of the MR head chip 4 is generally smaller than the width of the magnetic tape. Accordingly, the dummy glass piece 3 is required for making the width of the magnetic tape contact surface T wider than the contact surface of the MR head chip 4 so as to achieve uniform contact over the entire width of the magnetic tape. For the above purpose, the magnetic tape contact portion Tb of the dummy glass piece 3 is preliminarily shaped into the configuration similar to the magnetic tape contact portion Ta of the Mr head chip 4, while in one corner edge of the dummy glass piece 3 on the side adjacent to the corresponding edge of the MR head chip 4, there is formed a relief notch 3n to provide access for a tool for electrical connection.

Figure 6:
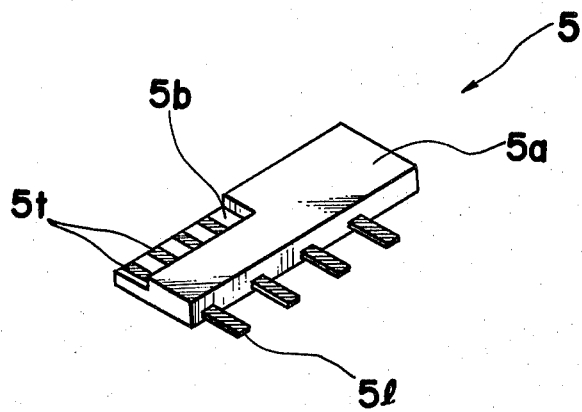
FIG. 6 is a perspective view showing the structure of a terminal plate employed in the MR head of FIG. 1.

In the terminal plate 5 produced by one piece or integral molding of the body 5a of resin material with lead terminal portions as shown in FIG. 6, terminals 5t on the side toward the MR head chip 4 are aligned with and are at the same pitch as the terminal lead-out portions Pn of the thin film pattern P of the MR head chip 4 and are exposed in a notched portion 5b of the body 5a for electrical connection with the terminal lead-out portions Pn of the MR head chip 4, with the exposed portion being flush with the thin film pattern P on the MR head chip 4. On the other hand, terminal portions 5l at the other ends of the terminals extending outwardly from the other side edge of the body 5a for external connection have a larger interval therebetween so as to facilitate soldering of wire leads thereto.

Figure 7:
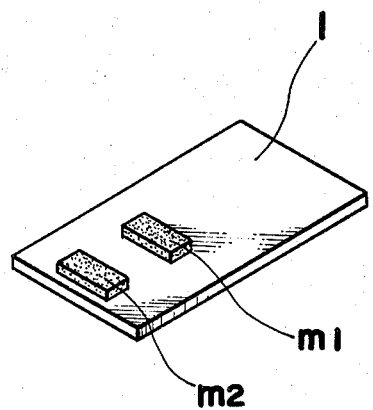
FIG. 7 is a perspective view of the cover plate employed in the MR head of FIG. 1.

Meanwhile, the cover plate 1 shown in FIG. 7 has the set of permanent biasing magnets m1 and m2 referred to earlier embedded at predetermined positions thereof. After bonding the dummy glass piece 3, MR head chip 4 and terminal plate 5 to the casing 2, one side edge of the cover plate 1, which acts as a datum surface, is brought into contact with the datum surface 2d of the casing 2 for setting the biasing permanent magnets m1 and m2 at predetermined positions so as to obtain the necessary biasing magnetic field. The permanent magnets m1 and m2 extending outwardly from the surface of the cover plate 1 are accommodated in the portion of the MR head chip 4 adjacent the cover glass plate 4b, and also in the notched portion 5b of the terminal plate 5.

For assembly of the MR head H described in the foregoing, bonding material is first applied to the bonding surface 2p of the casing 2, and the MR head 4, dummy glass piece 3 and terminal plate 5 are placed on said bonding surface 2p, and then, forces are applied thereto in the directions indicated by arrows A, B, C and D as shown in FIGS. 1 and 2. The force applied in the direction of the arrow A prevents each part from rising or floating away from surface 2p, while the force in the direction of the arrow B reduces the gap at the junction between the dummy glass piece 3 and MR head chip 4, when said MR head chip 4 is pressed against the datum surface 2d of the casing 2. Meanwhile, the forces applied in the directions indicated by the arrows C and D press the casing 2, MR head chip 4 and dummy glass piece 3 against a datum surface of a jig (not shown) having predetermined dimensions through the terminal plate 5 for positioning of these parts in the forward and backward directions.

While the forces as described above are being applied to the MR head H, the bonding material is hardened by raising the temperature, and thus the bonding is completed. After completion of the bonding, finishing of the magnetic tape contact surface T is effected for aligning the sliding surface Ta of the MR head chip 4 with the sliding surface Tb of the dummy glass piece 3. Subsequently, the lead-out portions Pn of the MR head chip 4 are connected with the lead terminals 5t of the terminal plate 5, for example, by processes such as wire bonding, solder re-flow bonding, etc. Thereafter, the cover plate 1 to which the biasing permanent magnets m1 and m2 are secured, is bonded to the assembly, and thus the assembly is completed.

As is clear from the foregoing description, according to the present invention, since the assembly of the MR head can be readily effected by pressing the MR head against the datum surfaces both vertically and laterally, control for obtaining correct dimensions such as elimination of positional deviations at the track portion, etc. is positively conducted, while the collective bonding of the main components in one plane makes it possible to perform subsequent processes easily and stably.

Furthermore, by the arrangement of the present invention as described above, the entire magnetic head can be made extremely thin, and therefore it has been made possible to provide an MR head with a plurality of tracks that can be accommodated in an extremely small space (approximately 3 mm in thickness). It is another advantage of the arrangement according to the present invention that the bias setting for the improvement of the linear function of the MR head may be readily effected, while the efficiency and yield in the mechanical assembly have been remarkably improved.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as being included therein.

What is claimed is:

1. A magnetoresistance effect type head which comprises:
    a casing having a U-shaped cross-section recess in one lateral surface and extending from one end edge to the other end edge, the bottom of said recess being a flat surface;
    a magnetoresistance effect type head chip and a tape contact surface member in said recess and positioned against said flat surface, said head chip and said tape contact surface member being side by side in a direction across said recess and each having a tape contact surface portion along the edge thereof at one end edge of said casing, said tape contact surface portions having the same cross-sectional shape and being aligned with each other, said magnetoresistance effect type head chip having lead-out terminals on the edge thereof which faces the other end edge of said casing;
    a terminal plate member in said recess against said flat surface and having one edge abutting the edges of said magnetoresistance effect type head chip and said tape contact surface member which are on the opposite sides from said tape contact surfacs and having terminal pins extending therethrough having the ends on the side abutting said magnetoresistance effect type head chip aligned with said lead-out terminals thereof; and
    a cover plate member in said recess covering said magnetoresistance effect type head chip, said tape contact surface member and said terminal plate member.

2. A magnetoresistance effect type head as claimed in claim 1 in which said terminal plate member and said head chip each have a notch therein at the portion thereof at which said terminal pins are aligned with said lead-out contacts and through which said terminal pins and said lead-out contacts are exposed so that they can be electrically connected.

3. A magnetoresistance effect type head as claimed in claim 1 in which said cover plate member has biasing magnetic field impressing means adjacent the junction of said lead-out contacts and said terminal pins.

4. A magnetoresistance effect type head as claimed in claim 3 in which said biasing magnetic field impressing means is a plurality of permanent magnets bonded to the surface of said cover plate member.

5. A magnetoresistance effect type head as claimed in claim 1 in which said tape contact surface member is a dummy glass piece.

* * * * *